US010659869B1

(12) United States Patent
    Bobuk

(10) Patent No.: US 10,659,869 B1
(45) Date of Patent: May 19, 2020

(54) CARTILAGE TRANSDUCER

(71) Applicant: Facebook Technologies, LLC, Menlo Park, CA (US)

(72) Inventor: Aaron Bobuk, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/270,753

(22) Filed: Feb. 8, 2019

(51) Int. Cl.
    *H04R 1/10* (2006.01)
(52) U.S. Cl.
    CPC ................................ *H04R 1/105* (2013.01)
(58) Field of Classification Search
    CPC .... H04R 1/105; H04R 1/1058; H04R 1/1066;
          H04R 1/1075; H04R 1/10; H04R 1/28;
          H04R 5/033; H04R 5/0335; H04R 17/00;
          A61B 5/6803
    See application file for complete search history.

(56) References Cited

U.S. PATENT DOCUMENTS

| | | | | |
|---|---|---|---|---|
| 9,105,261 B2* | 8/2015 | Horii | ...................... | G02C 11/10 |
| 9,900,676 B2* | 2/2018 | Dong | ...................... | H04R 5/023 |
| 10,231,053 B1* | 3/2019 | Mehra | ...................... | H04R 3/14 |
| 2005/0168111 A1* | 8/2005 | Bank | ...................... | H04R 7/045 |
| | | | | 310/348 |
| 2012/0237075 A1* | 9/2012 | East | ...................... | H04R 1/1066 |
| | | | | 381/381 |
| 2014/0231474 A1* | 8/2014 | Sugihara | ................ | G02B 7/002 |
| | | | | 224/181 |
| 2015/0063611 A1* | 3/2015 | Hillbratt | .............. | H04R 25/606 |
| | | | | 381/312 |
| 2017/0027470 A1* | 2/2017 | Inoue | ....................... | A61B 3/10 |
| 2017/0374452 A1* | 12/2017 | Liu | ........................ | H04R 1/025 |

* cited by examiner

Primary Examiner — Fan S Tsang
Assistant Examiner — Angelica M McKinney
(74) Attorney, Agent, or Firm — FisherBroyles, LLP (57) ABSTRACT

The disclosed computer-implemented method may include an apparatus having a support structure of a wearable device and a transducer coupled to the support structure. The transducer may be configured to generate movements in response to an audio input signal. The apparatus may also have a movement-conducting element coupled to the transducer. The movement-conducting element may be configured to apply the generated movements to a top portion of a user's ear. The movement-conducting element may maintain contact with the top portion of the user's ear so that the generated movements are consistently conducted to the user's ear regardless of which portion of the movement-conducting element contacts the top portion of the user's ear. Various other methods, systems, and computer-readable media are also disclosed.

20 Claims, 7 Drawing Sheets

CARTILAGE TRANSDUCER

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Artificial reality devices and systems are becoming increasingly popular. These artificial reality systems (e.g., augmented reality (AR), virtual reality (VR), etc.) may allow interaction with virtual objects set in in a virtual world, or with virtual objects overlaid in the normal, physical world. These artificial reality systems typically also include an audio system that provides audio sounds to the user such as speech or music.

In some cases, the audio systems used in these artificial reality systems may be cartilage conduction audio systems. Such cartilage conduction audio systems typically provide vibrations at the back or bottom of a user's ear, causing the user's ear to move in sync with the audio signal. This technique effectively uses the user's ear as a diaphragm to reproduce the audio signal.

Such cartilage conduction systems, however, tend to be big and bulky. For instance, these systems typically need to be adjusted to the user's head using straps, telescoping parts, or hinged mechanisms that keep contact with the back of the user's ear. Indeed, because these systems may attempt to use the back of the user's ear for cartilage conduction, they may need to add spring force to help conduct the sound. Adding springs, hinges, telescoping components, or other moving parts to the device adds weight and bulk. Moreover, these components may be subjected to repeated adjustments when worn by different users and are thus prone to wear out or break. Additionally, users may experience difficulty in properly positioning the cartilage conduction system to effectively and consistently reproduce audio signals. Traditional cartilage conduction devices may work in one position but may not work at all in different positions. As such, users having different head sizes or different ear sizes may need to move the device to multiple different positions before finding a position that actually works.

The present disclosure is generally directed to an apparatus, device or system for conducting an audio signal through the top of a user's ear. As will be explained in greater detail below, embodiments of the instant disclosure may avoid many of the moving parts, fitting elements and bulk associated with other, traditional cartilage conduction systems. Indeed, in at least some of the embodiments herein, a user may simply place the device on the top of their ears and may hear music, voice or other audio information. The user may not need to strap the device in place, adjust various fitting elements associated with the device or otherwise modify the device prior to using it. Rather, the user may simply don the device and, regardless of where the device couples with the user's ear, the device may provide a consistent signal.

Figure 2:
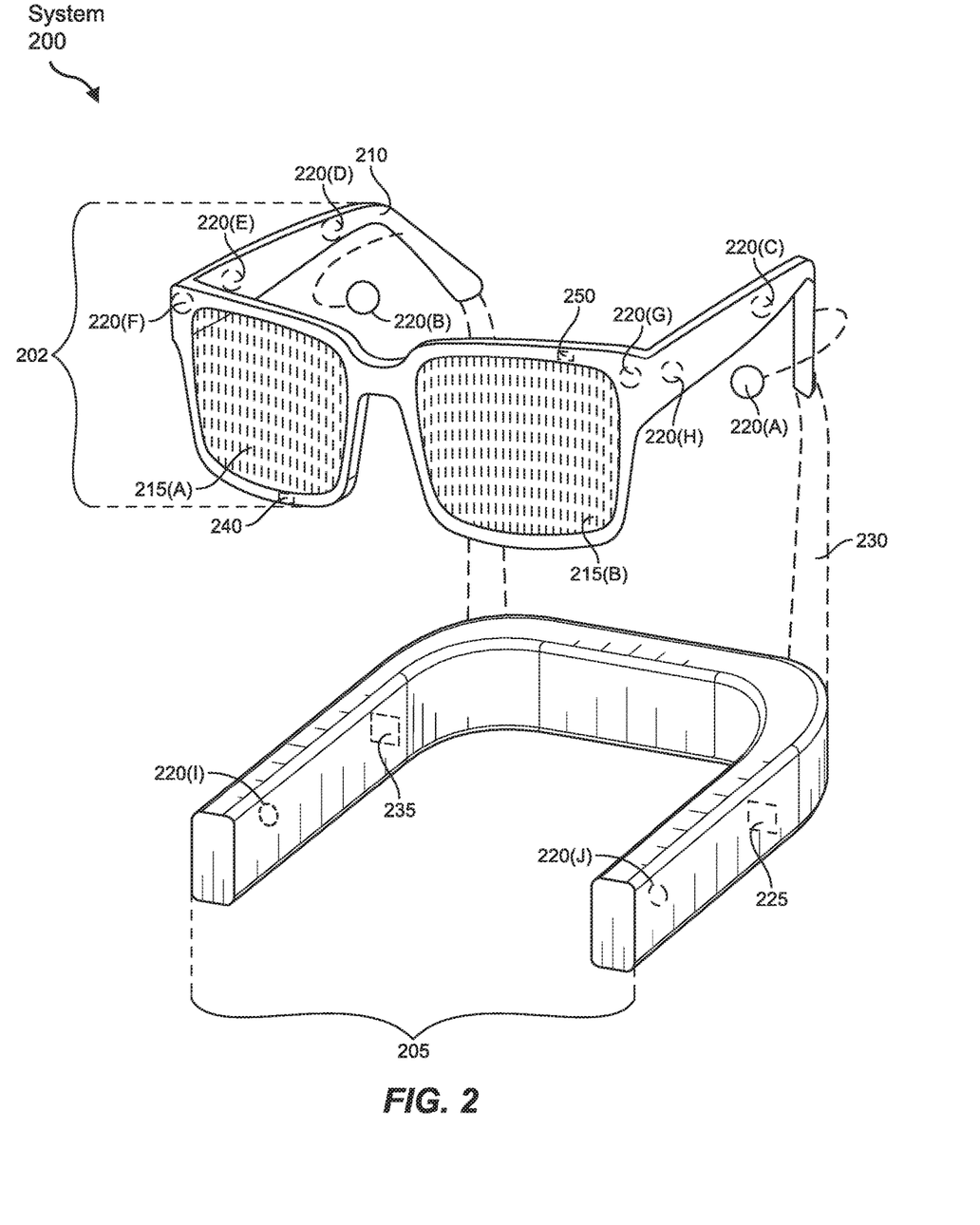
FIG. 2 illustrates an embodiment of an augmented reality headset and corresponding neckband.

For example, the devices described herein may be embodied in a pair of glasses, such as artificial reality glasses (e.g., glasses 202 of FIG. 2). These glasses may include rims, lenses, a nose bridge, and temple arms that span from the user's eyes to the user's ears. The temple arms may include hooks on the end near the ear to hold the glasses in place on the user's head. The temple arms may also include transducers and movement-conducting elements. The transducers may receive audio input signals and convert those signals to physical movement. The movement-conducting elements may receive movements generated by the transducers and apply those movements to the top of the user's ear. The movement-conducting elements may be designed in such a manner that, regardless of the size of the user's head, the movement-conducting element may consistently conduct the generated movements to the user's ear.

Figure 1:
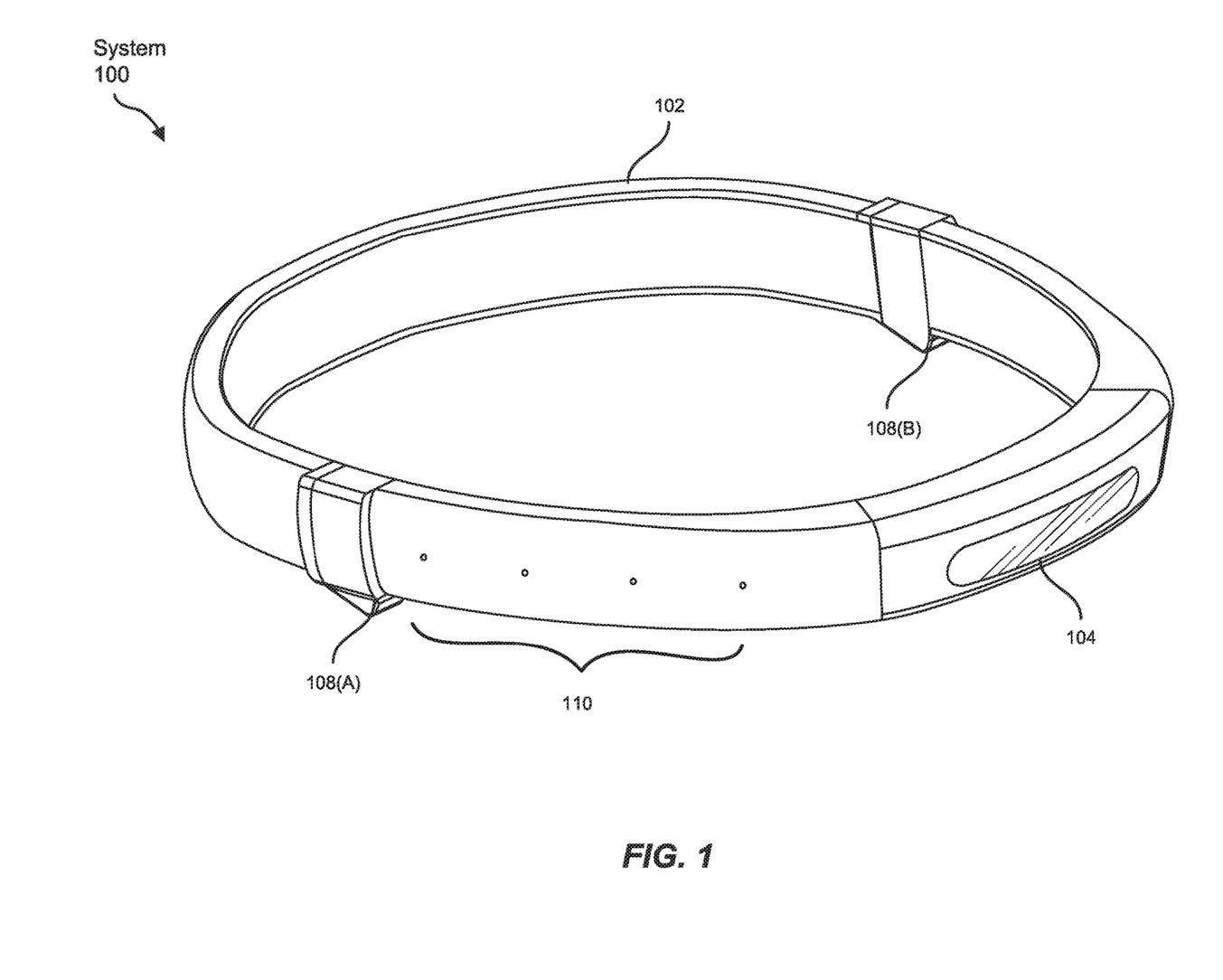
FIG. 1 illustrates an embodiment of an artificial reality headset.
Figure 3:
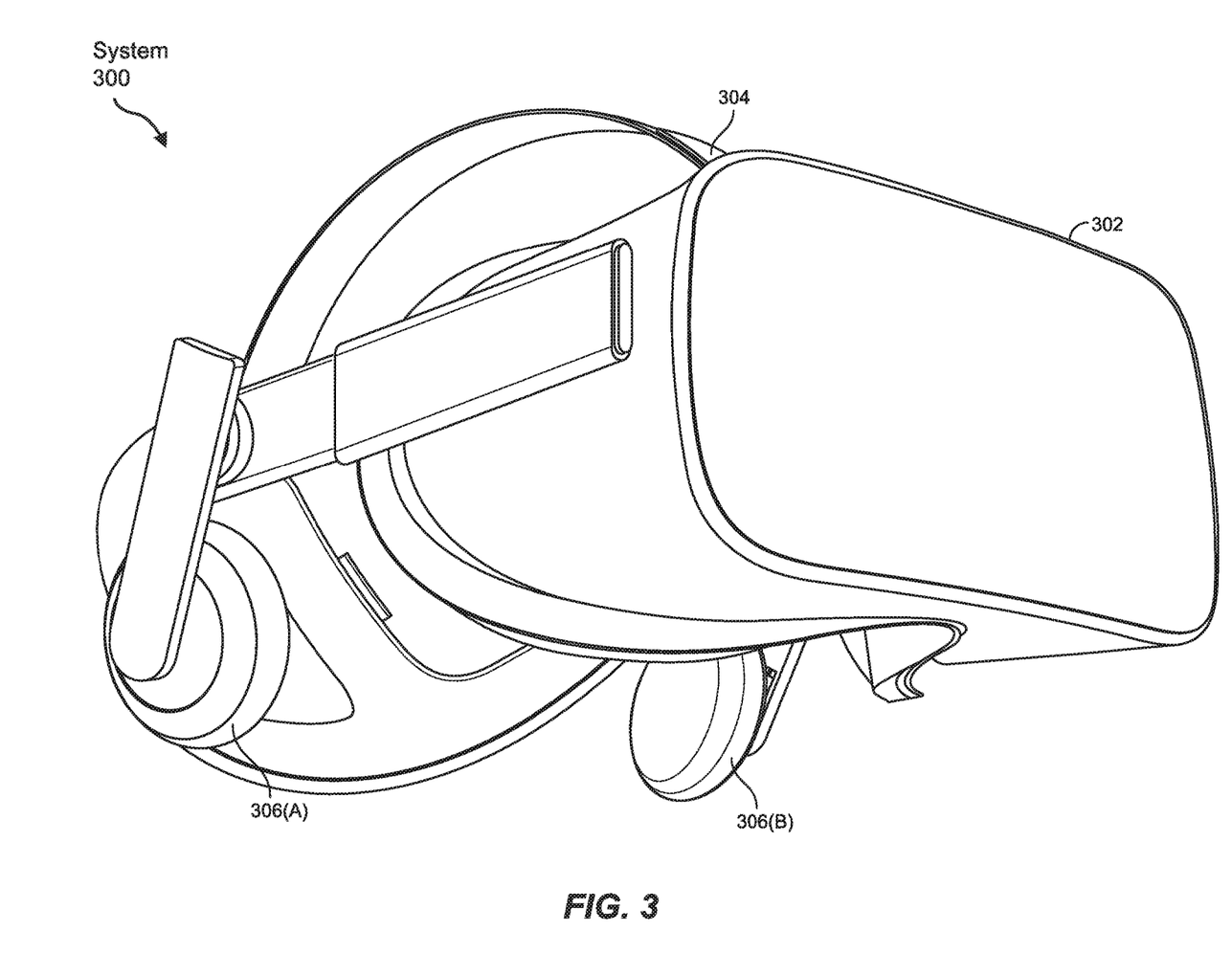
FIG. 3 illustrates an embodiment of a virtual reality headset.

Accordingly, even if a user with a relatively small head dons the glasses and one part of the movement-conducting element touches the top of the user's ear, or if a user with a relatively large head dons the glasses and another part of the movement-conducting element touches the top of the user's ear, the device may be configured to provide the same or similar experience to each user. Various techniques and embodiments may be implemented to accomplish this goal. These embodiments will be described in greater detail below with regard to FIGS. 1-9C. FIGS. 1-3, addressed initially below, describe many of the different artificial reality devices in which the embodiments described herein may be employed.

Artificial reality systems may be implemented in a variety of different form factors and configurations. Some artificial reality systems may be designed to work without near-eye displays (NEDs), an example of which is AR system 100 in FIG. 1. AR systems that work without NEDs may take a variety of forms, such as head bands, hats, hair bands, belts, watches, wrist bands, ankle bands, rings, neckbands, necklaces, chest bands, eyewear frames, and/or any other suitable type or form of apparatus. Other artificial reality systems may be designed to work with an NED that may provide visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. Examples of sensor 240 may include, without limitation, accelerometers, gyroscopes, magnetometers, other suitable types of sensors that detect motion, sensors used for error correction of the IMU, or some combination thereof. AR system 200 may also include a microphone array with a plurality of acoustic sensors 220(A)-220(J), referred to collectively as acoustic sensors 220.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, gloves, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. Neckband 205 may also include a controller 225 and a power source 235. Moreover, the neckband may include one or more transducers configured to provide haptic feedback to the user. The haptic feedback may include pulses, vibrations, buzzing or other sensations that communicate information to a user.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Figure 4:
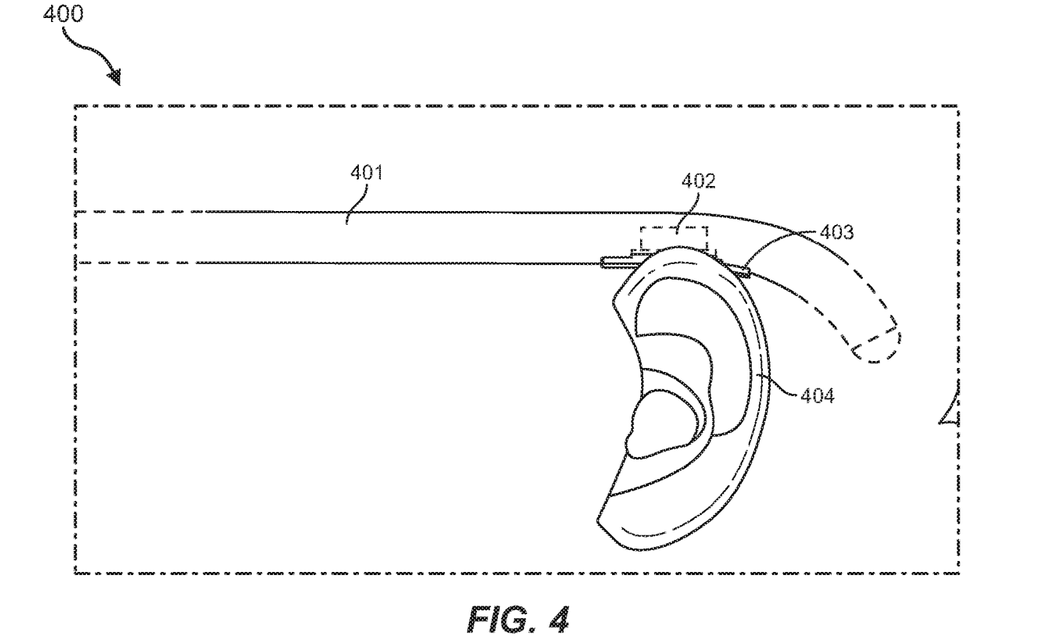
FIG. 4 illustrates an embodiment of an apparatus for conducting audio through the top portion of a user's ear.

FIG. 4 illustrates an example apparatus 400 that may be implemented in conjunction with or may be incorporated into any of the devices 100, 200, or 300 described above with regard to FIG. 1, 2, or 3, respectively, including augmented reality headsets, virtual reality headsets or other artificial reality devices. The apparatus 400 may include a support structure 401. This support structure 401 may be part of a wearable device such as a pair of artificial reality glasses. In other cases, the support structure 401 may be part of a different type of wearable device. In cases where the device is a pair of artificial reality glasses, the support structure 401 may include a temple arm which extends over the user's ear 404. The support structure 401 may also include lens rims, a nose bridge and connecting hardware that connects the temple arms to the lens rims. Other support structure elements may also be included.

The support structure 401 may be constructed from many different materials or combinations of materials including plastic, metal (e.g., aluminum, titanium, etc.), ceramic, carbon fiber, or other materials. The support structure 401 may be designed to house one or more transducers (e.g., 402). The transducer 402 of FIG. 4 may be configured to receive audio signals (e.g., analog or digital audio signals) from an electronic audio source and convert those signals to physical movements or vibrations. By generating these physical movements, the transducer 402 may reproduce the audio input signal. The transducer 402 may be coupled to the support structure 401 in a variety of different manners. For instance, the transducer 402 may be coupled to the support structure using adhesives or other bonding elements, using fasteners such as rivets or screws, or may be molded into the frame of the support structure 401.

These movements generated by the transducer 402 may be transferred to a user's ear 404 through a movement-conducting element 403 that is coupled to the transducer 402. The movement-conducting element 403 may be configured to apply or conduct the generated movements to a user's ear 404 and specifically to the top portion of the user's ear where the temple arm 401 contacts the user's ear. The movement-conducting element 403 may be designed to maintain contact with the top portion of the user's ear 404 so that the generated movements are consistently conducted to the user's ear regardless of which portion of the movement-conducting element contacts the top portion of the user's ear.

Figure 5:
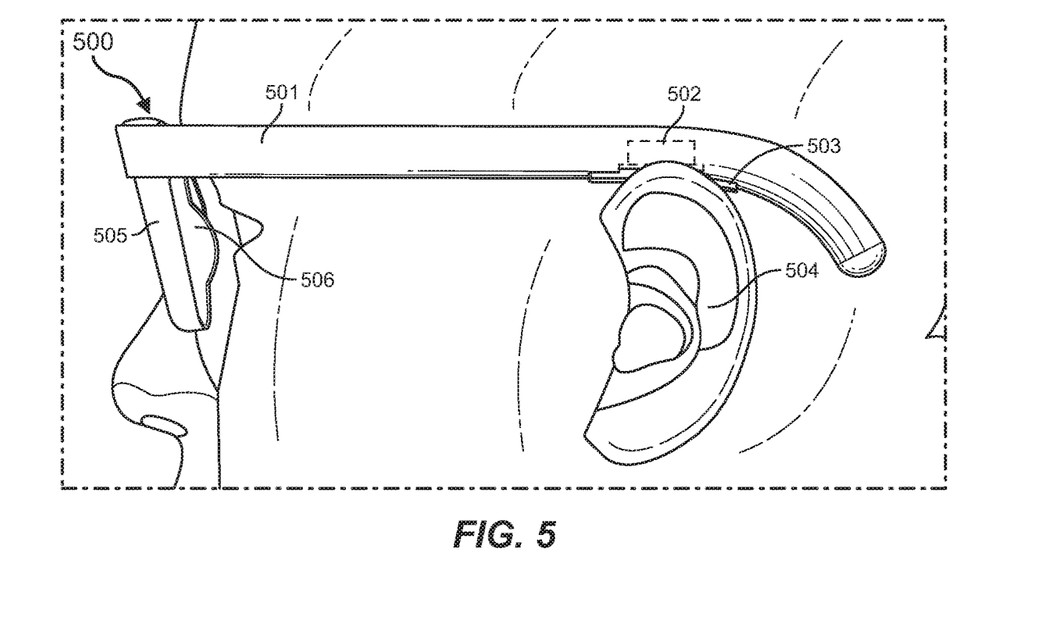
FIG. 5 illustrates an alternative embodiment of an apparatus for conducting audio through the top portion of a user's ear.

For example, as shown in FIG. 5, an apparatus 500 may be provided that includes a movement-conducting element that is placed over the ear. For instance, the apparatus 500 may include a temple arm 501 that extends from near the user's eye to behind the user's ear. In this example, the apparatus 500 may be a pair of artificial reality glasses. The artificial reality glasses may include rims 505, lenses (not shown), and other structural parts including a nose bridge 506. The artificial reality glasses may include a transducer 502 and a movement-conducting element 503 (which may be the same as or different than the movement-conducting element 403 of FIG. 4). The movement-conducting element 503 may be designed to rest on the top of the user's ear 504 and transmit physical movements or vibrations through the user's ear. The user's ear cartilage may vibrate according to the movements generated by the transducer 502. In this manner, the artificial reality glasses may transmit audio to the user by conducting the audio through the user's ear cartilage.

The movement-conducting element 503 may be designed to be long enough to accommodate many different head sizes. Men, women, and children of all different head sizes and head shapes may be able to use the same pair of artificial reality glasses with little or no alterations made to the length of the temple arm 501. Thus, without a telescoping frame or without hinged connectors that press the temple arm into the back of the user's ear, the embodiments described herein may accommodate many different types of users. In some embodiments, for example, the movement-conducting element 503 may be designed with a length of about 20-36 mm. Most users' temple arm length (i.e., the length from the user's eye to the top of the user's ear) is about 81 mm to about 107 mm. Moreover, some users tend to wear their glasses higher up or lower down on their nose, potentially adding 5-10 mm of eye relief variance.

As such, a movement-conducting element 503 designed with a length of 20-40 mm may still make contact with the top of the user's ear and conduct audio through the user's ear regardless of whether the user's temple arm length is 81 mm or 107 mm and regardless of where the user positions the glasses on their nose. Other embodiments may implement two different sizes of glasses, where one size has a shorter temple arm length which can accommodate smaller heads with a 20-30 mm movement-conducting element, and another size has a longer temple arm length which can accommodate larger heads with the same 20-30 mm long movement-conducting element. Users may try the glasses on to find an appropriate fit, or the embodiments herein may be configured to measure a user's response after performing a one-time calibration. Then, based on that response, the embodiments herein may recommend which size the user should wear. Still other embodiments may implement different two movement-conducting elements of shorter lengths such as, for example, two 15-20 mm movement-conducting elements. For comparison, traditional cartilage conduction systems that need to reach the back or the bottom of the user's ear need to account for a much larger amount of variance between the user's eyes and ears to ensure proper contact with the back or bottom of the user's ear.

The movement-conducting element 503 may be manufactured in different thicknesses in addition to different lengths. For instance, in some embodiments, the movement-conducting element 503 may be manufactured with a width of about 3 mm-5 mm. The movement-conducting element 503 may have curved edges and/or curved ends so as to slide easily onto the top of the user's ear. Pads or other elements may be included on the temple arm 501 to help keep the artificial reality glasses in place on the user's head. Putting the glasses on and taking the glasses off may be performed a user normally would with a pair of sunglasses or reading glasses. In contrast to other cartilage conduction systems that attach to the back or bottom of the user's ear which require hinges or other adjustable elements to firmly plant the conduction system to the back of the user's ear, the artificial reality glasses described herein may allow users to simply don or doff the glasses without making any adjustments to the device.

The movement-conducting element 503 may also be manufactured using different types of materials. In some cases, people's ears may respond differently when the movement-conducting element 503 is made from different types of materials. For example, person 1 might get the loudest and flattest acoustic response from material-A (e.g., aluminum), while person 2 might get the loudest and flattest acoustic response from material-B (e.g., plastic). In some embodiments, the movement-conducting element 503 may include an interchangeable pad attached to the bottom thereof. The pad may make direct contact with the top of the user's ear. Each interchangeable pad may be made from a different type of material. As such, the user may try new pads until they find a pad that conducts particularly well for them. In other embodiments, the movement-conducting element 503 itself may be interchangeable and may come in different sizes and shapes, each of which may be made from different materials. As such, different types of movement-conducting elements may be selected and used for each user.

Figure 6:
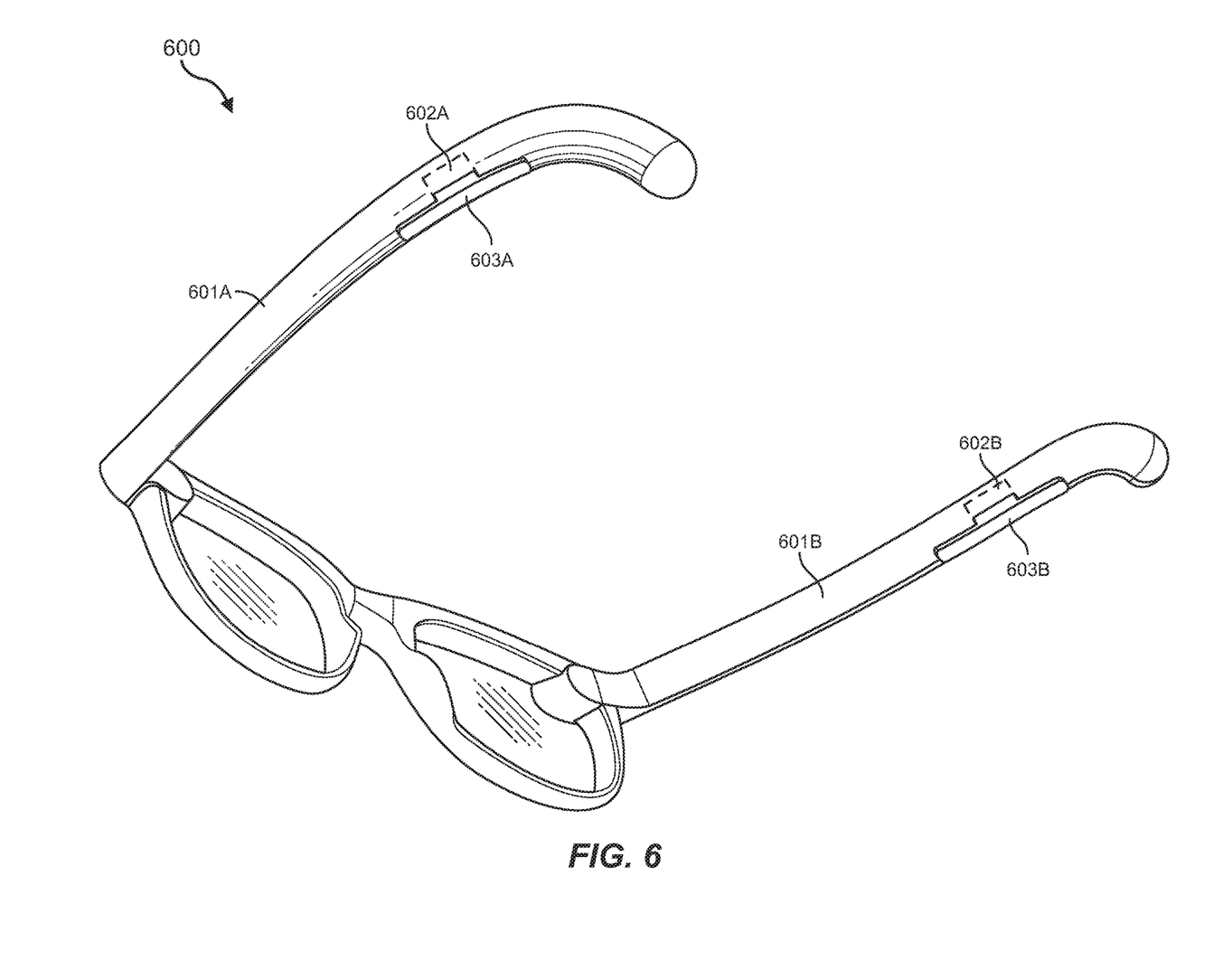
FIG. 6 illustrates an alternative embodiment of an apparatus for conducting audio through the top portion of a user's ear.

FIGS. 4 and 5 illustrate embodiments in which a single transducer and movement-conducting element are implemented. FIG. 6 illustrates an embodiment of an artificial reality device (e.g., glasses) 600 in which a transducer and a corresponding movement-conducting element are mounted over each of the user's ears. For example, artificial reality device 600 may include a transducer 602A on temple arm 601A and another transducer 602B on temple arm 601B. In this example, transducer 602A may be coupled to movement-conducting element 603A and transducer 602B may be coupled to movement-conducting element 603B. In such an embodiment, each transducer 602A/602B may reproduce an identical audio signal. In other cases, each transducer may be configured to reproduce slightly different signals. The signals transmitted to each of the transducer/movement-conducting element pairs may be governed by a controller (e.g., 225 of FIG. 2).

The support structure (e.g., including rims, lenses, nose bridge and temple arms), the transducers, and the conducting elements may each contribute to a combined weight associated with the wearable device 600. This combined weight may cause the movement-conducting elements 602A/602B to press down and maintain contact with the top portion of the user's ear. This contact, provided by the combined weight of the wearable device 600, may allow the movements generated by the transducers to be consistently conducted to the user's ears regardless of which portion of the movement-conducting element 603A/603B contacts the user's ear. Thus, if a user with a relatively long temple arm length dons the wearable device 600 and the back portion of the movement-conducting element contacts the user's ear, the weight of the device may provide sufficient contact to the user's ear that a clear and consistent conductive signal may be transmitted through the user's ear cartilage. Similarly, if a user with a relatively short temple arm length dons the wearable device 600 and the front portion of the movement-conducting element contacts the user's ear, the weight of the device may also allow the movement-conducting elements 602A/602B to conduct a clear and consistent signal through the user's ear cartilage.

Figure 7:
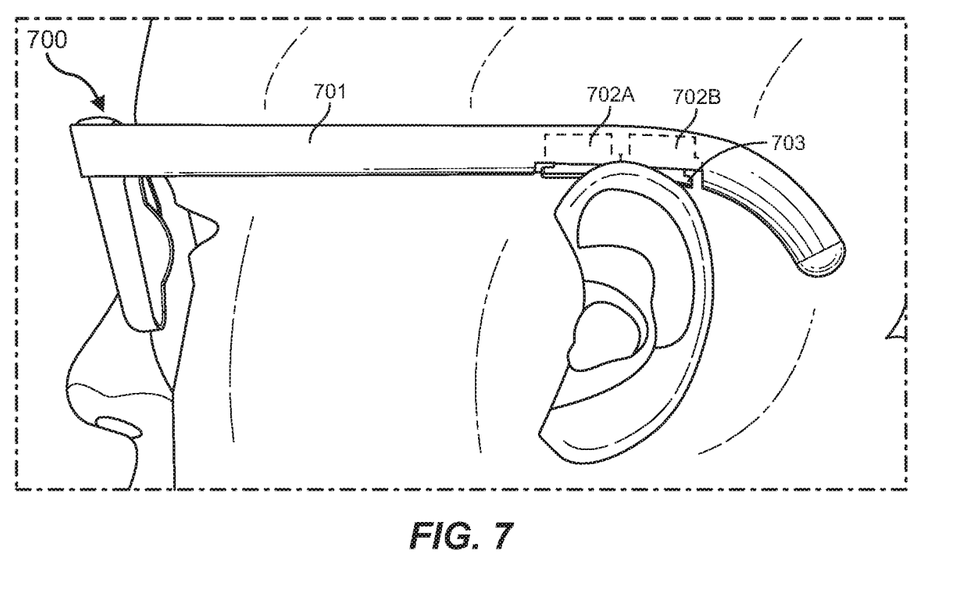
FIG. 7 illustrates an alternative embodiment of an apparatus for conducting audio through the top portion of a user's ear.

In some embodiments, as shown in FIG. 7, an apparatus such as artificial reality glasses 700 may include two (or more) transducers coupled to each movement-conducting element. For instance, as illustrated on temple arm 701 of wearable device 700, the movement-conducting element 703 may have two transducers 702A and 702B coupled thereto. Each transducer 702A/702B may be driven using the same audio input signal or may be driven using different audio input signals. In some cases, one of the transducers 702A/702B may be used while the other is inactive.

For instance, in some embodiments, transducer 702A may be used if the wearer of the device 700 has a relatively short temple arm, and transducer 702B may be used if the wearer has a relatively long temple arm. In such cases, the wearable device 700 may be configured to detect a pressure on the movement-conducting element 703 provided by the user's ear. If the detected pressure is greater at transducer 702A (e.g., measured by a piezoelectric pressure sensor or other pressure detecting component), then transducer 702A may be used to conduct the audio input signal to the user's ear. Alternatively, if the detected pressure is greater at transducer 702B, then transducer 702B may be used to conduct the audio signal.

Furthermore, three, four or more transducers may be implemented in the wearable device 700. Any one or more of these transducers may be implemented to reproduce the audio input signal. The transducers may reproduce the signal alone or in combination with other transducers. For example, if the wearable device 700 includes four transducers in each temple arm, a grouping of two transducers may be used (e.g., the first and second, or second and third, or third and fourth transducers) to conduct the signal through the user's ear cartilage, depending on where the greatest pressure was detected on the movement-conducting element 703. In other embodiments where multiple transducers are involved, the user may simply select, via a software menu provided by the wearable device 700, which transducers are to be used. The user may make this selection after trying different transducers or combinations of transducers and then selecting the one or group of transducers that produced the best sound quality. Moreover, in some cases, the user's head may not be uniform. That is, the user's temple arm length may differ slightly on one side or the other. In such cases, the transducer used (e.g., 702 or 702B) or grouping of transducers used (e.g., 702A and 702B) may differ on each side. This, again, may be customized automatically or manually for each user based on detected pressure or based on user selection.

Figure 8A:
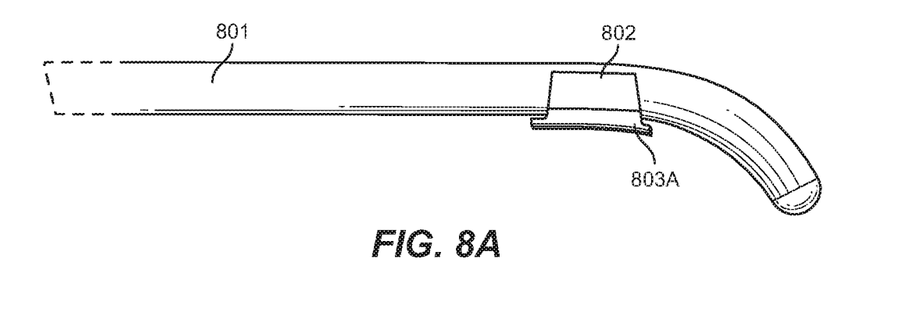
FIGS. 8A and 8B illustrate embodiments of relatively longer and shorter movement conduction elements.
Figure 8B:
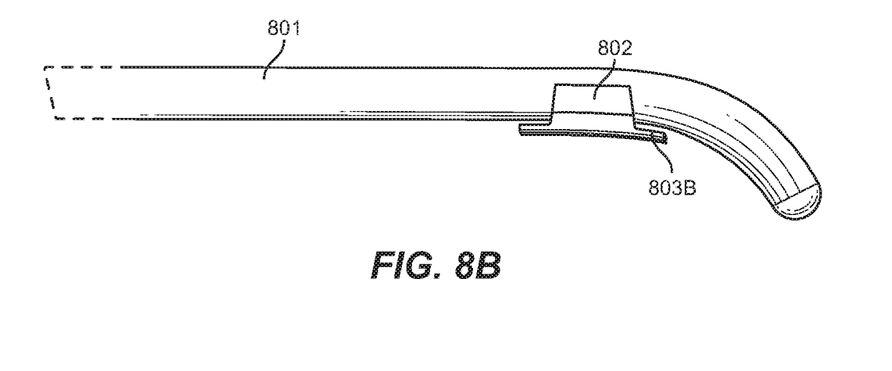

FIGS. 8A and 8B illustrate temple arms 801 having different sizes of movement-conducting elements. For instance, FIG. 8A illustrates a movement-conducting element 803A that has a relatively short length, while FIG. 8B illustrates a movement-conducting element 803B that has a relatively long length that his longer than the movement-conducting element 803A. Longer or shorter lengths of the movement-conducting element may affect how and where the movement-conducting element couples with the top of the user's ear. For instance, a movement-conducting element with a shorter length (e.g., 803A) may be designed for use with children or adults with smaller heads (and thus shorter temple arm distances). A movement-conducting element with a longer length (e.g., 803B) may be designed for use with adults that have larger heads and thus longer temple arm distances. A longer length movement-conducting element may accommodate more people, while a shorter length movement-conducting element may reduce a small amount of weight and bulk.

In some embodiments, the movement-conducting element (either 803A or 803B) may rest partially on the top of a user's ear, while other portions of the movement-conducting element remain surrounded by air. Those portions of the movement-conducting element that are surrounded by air may provide at least some amount of air conduction of the input signal to the user's ear. Movement-conducting elements that are longer (e.g., 803B) may be better suited to performing such air conduction. The air conduction may act as a speaker, conducting at least some of the audio input signal through the air to the user's ear drum. Additionally or alternatively, small speakers may be placed at different locations on the temple arm 801 to project a portion of the audio signal to the user. Such speakers may be used in addition to any movement-conducting elements 803A/803B. The additional speakers may be implemented, for example, to provide audio signals that may not be entirely reproduced using the movement-conducting elements 803A/803B. As such, the additional speakers and/or air conduction may supplement the audio signal conducted through the user's ears via the movement-conducting elements 803A/803B.

In addition to external speakers, other components may also be added to the temple arms 801. For example, a bone conducting transducer may be added to the temple arm 801 (e.g., on the hook at the end of the temple arm). The bone conducting transducer may be designed to conduct the audio input signal through the user's skull. Any or all of these components may be controlled using software and/or hardware controllers. As such, these components may work together to provide a full spectrum of frequencies. This combination of bone conduction, cartilage conduction and air conduction may be customized for each user, either automatically, or manually through settings provided in a user interface. Thus, a user may opt to increase bone conduction, or may opt to decrease air conduction, etc. Still further, the user may specify when certain types of conduction are to be used. For instance, the user may initialize a game mode where it is permissible for other surrounding users to hear the audio. Thus, in these cases, air conduction may be used. In cases where the user does not want others to hear the audio (e.g., private phone calls), the user may specify that only cartilage conduction or bone conduction are to be used. Thus, the user may have a large amount of control over which conduction components are used to convey the audio input signal.

In some embodiments, the movements generated by the movement-conducting element(s) may be tailored to specific frequencies or frequency ranges. For example, the movements generated by the transducer 802 may be consistently conducted to the user's ears within a specified frequency range. This conduction may occur regardless of which portion of the movement-conducting element 803A/803B contacts the top portion of the user's ear. In some embodiments, the specified frequency range may be about 20 Hz-20,000 Hz. In other cases, the specified frequency range may be about 200 Hz-3,000 Hz. In such cases, the movement-conducting element 803A/803B may be designed for and optimized for voice performance or voice enhancement. This frequency range may also be optimal for providing spatialization cues to the user.

In some cases, the transducer 802 may be a custom-designed and custom-built transducer that is optimized to reproduce frequencies at around 200-3,000 Hz. In such cases, the custom-designed transducer may be impedance-matched to the user's ear. In other examples, such custom-built transducers may be designed for different frequency ranges or for certain specified types of acoustics. The transducer 802 and/or movement-conducting element 803A/803B may each be designed to generate and conduct certain ranges of frequencies better than others. Thus, transducer 802 and movement-conducting element 803A/803B, as well as the potential additional speakers and bone conduction transducers, may each be designed and implemented to provide certain frequencies and to fill in the gaps in frequencies that may be left out by the custom-built transducers.

Figure 9A:
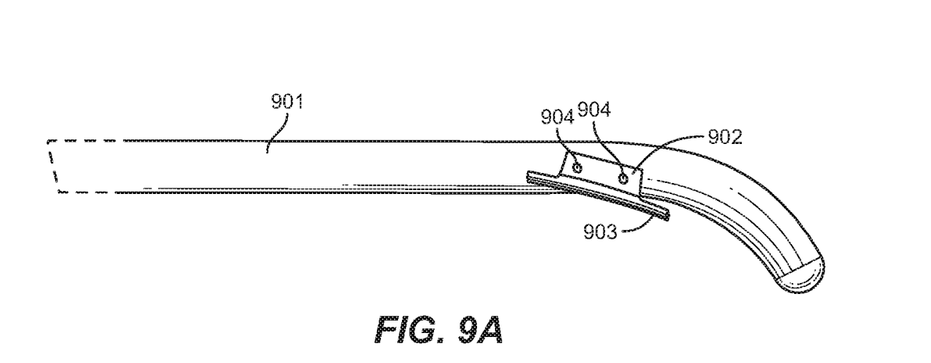
FIGS. 9A-9C illustrate embodiments of an apparatus for conducting audio through the top portion of a user's ear in which a movement conduction element is aligned to accommodate different users.
Figure 9B:
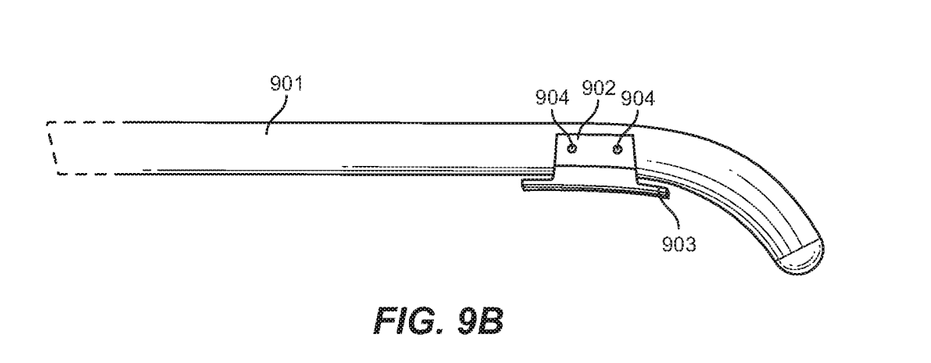
Figure 9C:
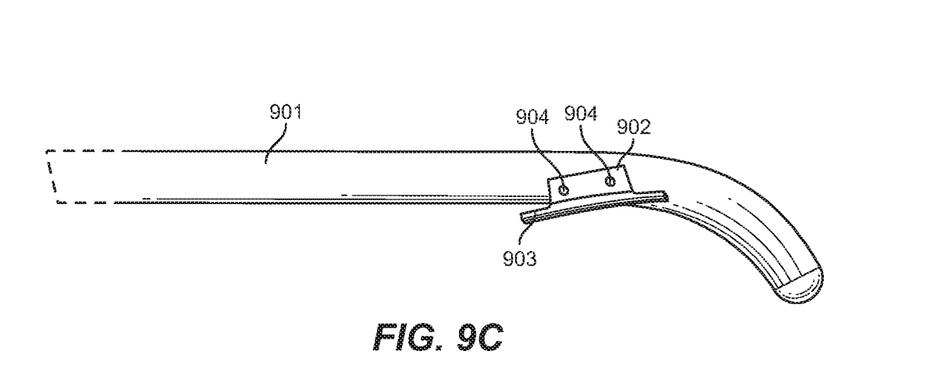

FIGS. 9A-9C illustrate embodiments of a temple arm 901 in which a movement-conducting element 903 and/or a corresponding transducer 902 may be moved into different positions. For example, when a user dons a pair of artificial reality glasses or other type of virtual reality headset, the temple arms may rest on the top portion of the user's ears. Depending on where the movement-conducting element 903 hits the user's ear, the counterpressure applied by the user's ear against the movement-conducting element 903 may cause the movement-conducting element 903 to move upward on one end and downward on the other end. For instance, the movement-conducting element 903 may include a proximal end and a distal end. The proximal end may face the user's eye and the distal end may face the back of the user's head. The proximal and distal ends may be coupled to one or more counterbalancing members 904. When pressure is applied by the top of the user's ear on either the proximal end or the distal end of the movement conducting member 903, the counterbalancing members 904 may apply a counterforce to balance the opposite respective end of the movement-conducting element.

Accordingly, as shown in FIG. 9A, a user may have a relatively small head and, as such, the user's ear may make contact with the proximal end of the movement-conducting element 903. This may push the proximal end upward and the distal end downward. The counterbalancing member(s) 904 may apply a counterforce (e.g., a spring force) to move the movement-conducting element 903 back into its proper operating position, as shown in FIG. 9B. If, on the other hand, the user has a relatively large head, the user's ear may make contact with the distal end of the movement-conducting element 903. This may, in turn, push the distal end of the movement-conducting element 903 upward and the proximal end downward (as shown in FIG. 9C). Again, the counterbalancing member(s) 904 may apply a counterforce to move the movement-conducting element 903 back into its proper operating position shown in FIG. 9B.

The counterbalancing member(s) 904 may include coil springs, levers, actuators, or other components designed to provide a counterpressure when a pressure is applied. Accordingly, because the counterbalancing members 904 maintain the movement-conducting element's balanced and level position (as shown in FIG. 9B), the movements generated by the transducer 902 may be consistently conducted to the user's ear regardless of where the movement-conducting element couples with the user's ear. As such, artificial reality devices having these components, or some combination thereof, may accommodate a wide range of users and head sizes without needing any adjustment mechanisms such as straps or hinged pieces that press the cartilage conduction device against the user's head.

A corresponding system may include a support structure of a wearable device and a transducer coupled to the support structure. The transducer may be configured to generate movements in response to an audio input signal. The system may also include a movement-conducting element coupled to the transducer. The movement-conducting element may be configured to apply the generated movements to a top portion of a user's ear. The movement-conducting element may maintain contact with the top portion of the user's ear so that the generated movements may be consistently conducted to the user's ear regardless of which portion of the movement-conducting element contacts the top portion of the user's ear.

In some embodiments, as noted with regard to FIGS. 9A-9C, this system may include one or more elements to counteract pressures applied to the movement-conducting element 903. Such components may include, for example, a dual-spring mechanism (e.g., 904) to provide a counterbalancing force. The dual-spring mechanism may also serve to isolate the transducer 902 from the support structure (e.g., the temple arm 901). This may prevent the movements generated by the transducer from leaking to the support structure. In some embodiments, the dual-spring mechanism 904 may provide some amount of additional accommodation from spring actuation. The dual-spring mechanism may provide, for example, an additional 1-2 mm of accommodation, allowing users with slightly smaller or slightly larger heads to use the same device and still properly hear each of the frequencies provided by the transducer 902 and corresponding movement-conducting element 903.

In addition to the system, a corresponding artificial reality device may also be provided. The artificial reality device (e.g., 500 of FIG. 5) may include a glasses frame and a transducer coupled to the glasses frame. The transducer may be configured to generate movements in response to an audio input signal. The artificial reality device may also include a movement-conducting element coupled to the transducer. The movement-conducting element may be configured to apply the generated movements to a top portion of a user's ear. The movement-conducting element may maintain contact with the top portion of the user's ear so that the generated movements are consistently conducted to the user's ear regardless of which portion of the movement-conducting element contacts the top portion of the user's ear.

In some embodiments, as noted above, the artificial reality device may include multiple transducers. Indeed, FIG. 7 illustrates an embodiment in which two transducers 702A and 702B are illustrated, both of which are coupled to movement-conducting element 703. In cases where multiple transducers are used in a given device, at least some of those transducers may be designed to operate at specified frequencies or frequency ranges. For instance, transducer 702A may be implemented for mid-range frequencies (e.g., 2,000 Hz-5,000 Hz) and transducer 702B may be implemented for high-range frequencies (e.g., 5,000 Hz-15,000 Hz). Other transducers may also be included which may be designed to reproduce low-range frequencies (e.g., 100-2,000 Hz). In other cases, air conduction speakers may be implemented to provide the higher-range frequencies, while cartilage conduction transducers are implemented for mid-range and low-range frequencies. The frequency ranges identified above, it should be noted, are chosen arbitrarily, and different transducers or sets of transducers may be designed and implemented for many different frequency ranges. In some embodiments, a transducer or pair of transducers may be designed for a specific frequency curve. As such, a product designer may select a specific frequency curve, for example, and then customize the corresponding transducer(s) to cover that frequency curve. This may be beneficial for purpose-built devices such as artificial reality devices designed for interpersonal interaction.

In this manner, systems, apparatuses and devices may be provided which consistently conduct movements generated by transducers to a user's ears. These systems may provide these movements through movement-conducting elements which rest at the tops of the user's ears. These systems may accommodate a wide range of users without the users having to adjust the device using straps, telescoping mechanisms, hinging mechanisms or other ways of ensuring contact between the movement-conducting element and the user's ears. The systems described herein may allow users to easily don and doff the device, while still accommodating a wide range of user head sizes. Furthermore, counterbalancing components may be implemented which may counteract any uneven pressures applied by the user's ears on the movement-conducting elements. As such, regardless of where the device couples with the user's ears, the device may provide a consistent reproduction of an audio input signal to the user.

Accordingly, the instant disclosure describes an apparatus that may include a support structure of a wearable device and a transducer coupled to the support structure. The transducer may be configured to generate movements in response to an audio input signal. The apparatus may also include a movement-conducting element coupled to the transducer. The movement-conducting element may be configured to apply the generated movements to the top portion of a user's ear. The movement-conducting element may maintain contact with the top portion of the user's ear so that the generated movements are consistently conducted to the user's ear regardless of which portion of the movement-conducting element contacts the top portion of the user's ear.

In some examples, the apparatus may include a pair of artificial reality glasses. In such cases, the artificial reality glasses may include at least one temple arm. The movement-conducting element may be positioned on the at least one temple arm of the artificial reality glasses. In some examples, the apparatus may include at least one transducer and at least one movement-conducting element over each of the user's ears.

In some examples, the support structure, the transducer, and the conducting element may each contribute to a combined weight associated with the wearable device. This combined weight of the wearable device may cause the conducting element to maintain contact with the top portion of the user's ear so that the generated movements are consistently conducted to the user's ear regardless of which portion of the movement-conducting element contacts the top portion of the user's ear.

In some examples, the apparatus may include at least two transducers coupled to the movement-conducting element. In some examples, the movement-conducting element may include a proximal end and a distal end. The proximal and distal ends may be coupled to a counterbalancing member. Pressure provided by the weight of the apparatus and the top of the user's ear on either the proximal end or the distal end of the movement conducting member may cause the counterbalancing member to apply a counterforce to balance the opposite respective end of the movement-conducting element. As such, the generated movements may be consistently conducted to the user's ear regardless of where the movement-conducting element contacts the user's ear.

In some examples, the generated movements may be consistently conducted to the user's ear within a specified frequency range regardless of which portion of the movement-conducting element contacts the top portion of the user's ear. In some examples, the specified frequency range may be about 2,000 Hz-4,000 Hz, and may be customized for spatialization and/or voice audio signals. In some examples, the transducer may be a custom-built transducer that is optimized for specified frequencies or specific applications. In other examples, the transducer may be a custom-built transducer that is optimized for specified acoustics.

A corresponding system may include the following: a support structure of a wearable device and a transducer coupled to the support structure. The transducer may be configured to generate movements in response to an audio input signal. The system may also include a movement-conducting element coupled to the transducer. The movement-conducting element may be configured to apply the generated movements to the top portion of a user's ear. The movement-conducting element may maintain contact with the top portion of the user's ear so that the generated movements are consistently conducted to the user's ear regardless of which portion of the movement-conducting element contacts the top portion of the user's ear.

In some examples, the system may include a dual-spring mechanism to isolate the transducer from the support structure. In some examples, the dual-spring mechanism may provide at least a specified amount of additional accommodation from spring actuation. In some examples, the movement-conducting element may rest at least partially on the top of the user's ear. In such cases, at least part of the movement-conducting element may be surrounded by air, providing at least some air conduction of the input signal to the user's ear.

In some examples, the system may include a second movement-conducting element. In such cases, one of the movement-conducting elements may include a first specified length, and the other movement-conducting element may include a second specified length that is longer than the first specified length. In some examples, the system may include a bone-conducting transducer that may be configured to generate additional movements in response to the audio input signal. The additional movements may be optimized for bone conduction.

A corresponding artificial reality device may also be provided. The artificial reality device may include a glasses frame and a transducer coupled to the glasses frame. The transducer may be configured to generate movements in response to an audio input signal. The artificial reality device may also include a movement-conducting element coupled to the transducer. The movement-conducting element may be configured to apply the generated movements to the top portion of a user's ear. The movement-conducting element may maintain contact with the top portion of the user's ear so that the generated movements are consistently conducted to the user's ear regardless of which portion of the movement-conducting element contacts the top portion of the user's ear.

In some examples, the glasses frame may include two temple arms. In such cases, the movement-conducting element may be positioned on at least one of the temple arms. In some examples, the artificial reality device may include a transducer for mid-range frequencies and a transducer for high-range frequencies. In some examples, the artificial reality device may further include another transducer for low-range frequencies.

Features from any of the embodiments described herein may be used in combination with one another in accordance with the general principles described herein. These and other embodiments, features, and advantages will be more fully understood upon reading the following detailed description in conjunction with the accompanying drawings and claims.

As detailed above, the artificial reality devices, controllers, computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive audio data to be transformed, transform the audio data, output a result of the transformation to generate a conduction signal, and use the result of the transformation to conduct the signal through the user's ears. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. An apparatus comprising:
a support structure of a wearable device, the support structure comprising an upper portion and a lower portion;
at least one transducer mechanically coupled to the support structure, the at least one transducer being configured to generate movements in response to an audio input signal; and
at least one movement-conducting element mechanically coupled to the transducer, the movement-conducting element being positioned on the lower portion of the support structure, such that the movement-conducting element contacts a top portion of a user's ear and applies the generated movements directly to the top portion of the user's ear,
wherein the movement-conducting element maintains contact with the top portion of the user's ear such that the generated movements are consistently conducted to the user's ear regardless of which portion of the movement-conducting element contacts the top portion of the user's ear.

2. The apparatus of claim 1, wherein the apparatus comprises a pair of artificial reality glasses.

3. The apparatus of claim 2, wherein the support structure comprises at least one temple arm, and wherein the movement-conducting element is positioned on the at least one temple arm of the artificial reality glasses.

4. The apparatus of claim 2, wherein the apparatus includes at least one transducer and at least one movement-conducting element over each of the user's ears.

5. The apparatus of claim 1, wherein the support structure, the transducer, and the conducting element each contribute to a combined weight associated with the wearable device, and
wherein the combined weight of the wearable device causes the movement-conducting element to maintain contact with the top portion of the user's ear such that the generated movements are consistently conducted to the user's ear regardless of which portion of the movement-conducting element contacts the top portion of the user's ear.

6. The apparatus of claim 1, wherein the apparatus includes at least two transducers coupled to the movement-conducting element.

7. The apparatus of claim 1, wherein the movement-conducting element includes a proximal end and a distal end, the proximal and distal ends being coupled to a counterbalancing member, and
wherein a pressure provided by the top of the user's ear on either the proximal end or the distal end of the movement conducting member causes the counterbalancing member to apply a counterforce to balance the opposite respective end of the movement-conducting element, such that the generated movements are consistently conducted to the user's ear regardless of where the movement-conducting element couples with the user's ear.

8. The apparatus of claim 1, wherein the generated movements are consistently conducted to the user's ear within a specified frequency range regardless of which portion of the movement-conducting element contacts the top portion of the user's ear.

9. The apparatus of claim 1, wherein the specified frequency range comprises about 20 Hz-20,000 Hz.

10. The apparatus of claim 1, wherein the at least one transducer comprises a custom-built transducer that is optimized for specified frequencies.

11. The apparatus of claim 1, wherein the at least one transducer comprises a custom-built transducer that is optimized for specified acoustics and that is further impedance-matched to the user's ear.

12. A system comprising:
a support structure of a wearable device, the support structure comprising an upper portion and a lower portion;
at least one transducer mechanically coupled to the support structure, the at least one transducer being configured to generate movements in response to an audio input signal; and
at least one movement-conducting element mechanically coupled to the transducer, the movement-conducting element being positioned on the lower portion of the support structure, such that the movement-conducting element contacts a top portion of a user's ear and applies the generated movements directly to the top portion of the user's ear,
wherein the movement-conducting element maintains contact with the top portion of the user's ear such that the generated movements are consistently conducted to the user's ear regardless of which portion of the movement-conducting element contacts the top portion of the user's ear.

13. The system of claim 12, further comprising a dual-spring mechanism to isolate the at least one transducer from the support structure.

14. The system of claim 13, wherein the dual-spring mechanism provides at least a specified amount of additional accommodation from spring actuation.

15. The system of claim 12, wherein the movement-conducting element rests partially on the top of the user's ear, and wherein at least part of the movement-conducting element is surrounded by air, providing at least some air conduction of the input signal to the user's ear.

16. The system of claim 12, further comprising a second movement-conducting element, wherein the movement-conducting element comprises a first specified length, and wherein the second movement-conducting element comprises a second specified length that is longer than the first specified length.

17. The system of claim 12, further comprising a bone-conducting transducer configured to generate additional movements in response to the audio input signal, the additional movements being optimized for bone conduction.

18. An artificial reality device comprising:
- a glasses frame, the glasses frame comprising an upper portion and a lower portion;
- at least one transducer mechanically coupled to the glasses frame, the at least one transducer being configured to generate movements in response to an audio input signal; and
- at least one movement-conducting element mechanically coupled to the transducer, the movement-conducting element being positioned on the lower portion of the glasses frame, such that the movement-conducting element contacts a top portion of a user's ear and applies the generated movements directly to the top portion of the user's ear,
- wherein the movement-conducting element maintains contact with the top portion of the user's ear such that the generated movements are consistently conducted to the user's ear regardless of which portion of the movement-conducting element contacts the top portion of the user's ear.

19. The artificial reality device of claim 18, wherein the glasses frame includes two temple arms, and wherein the movement-conducting element is positioned on at least one of the temple arms.

20. The artificial reality device of claim 18, wherein the artificial reality device includes an air conduction speaker for high-range frequencies, and further includes at least one transducer for mid-range and low-range frequencies.

* * * * *